United States Patent
Endlicher

(10) Patent No.: US 9,527,682 B2
(45) Date of Patent: Dec. 27, 2016

(54) DEVICE AND METHOD FOR REMOVING PLANAR OBJECTS

(71) Applicant: LISEC AUSTRIA GMBH, Seitenstetten (AT)

(72) Inventor: Hannes Endlicher, Melk an der Donau (AT)

(73) Assignee: LISEC AUSTRIA GMBH, Seitenstetten (AT)

(*) Notice: Subject to any disclaimer, the term of this patent is extended or adjusted under 35 U.S.C. 154(b) by 0 days.

(21) Appl. No.: 14/412,740

(22) PCT Filed: Feb. 10, 2014

(86) PCT No.: PCT/AT2014/000029
§ 371 (c)(1),
(2) Date: Jan. 5, 2015

(87) PCT Pub. No.: WO2014/134641
PCT Pub. Date: Sep. 12, 2014

(65) Prior Publication Data
US 2015/0147150 A1 May 28, 2015

(30) Foreign Application Priority Data
Mar. 8, 2013 (AT) .................. A 186/2013

(51) Int. Cl.
*B65G 47/91* (2006.01)
*B65G 49/06* (2006.01)
*B65G 59/00* (2006.01)

(52) U.S. Cl.
CPC .......... *B65G 49/069* (2013.01); *B65G 59/005* (2013.01); *B65G 47/918* (2013.01); *B65G 2201/022* (2013.01); *B65G 2249/04* (2013.01)

(58) Field of Classification Search
CPC . B65G 49/069; B65G 59/005; B65G 2249/04; B65G 2201/022; B65G 47/918
See application file for complete search history.

(56) References Cited

U.S. PATENT DOCUMENTS

| | | | |
|---|---|---|---|
| 4,522,544 A | 6/1985 | Shah et al. | |
| 5,044,877 A * | 9/1991 | Constant | B07C 1/025 198/465.1 |

(Continued)

FOREIGN PATENT DOCUMENTS

| | | |
|---|---|---|
| EP | 0 519 447 | 12/1992 |
| EP | 2 070 848 | 6/2009 |

(Continued)

OTHER PUBLICATIONS

International Search Report dated Jun. 26, 2014, corresponding to PCT/AT2014/000029.

(Continued)

*Primary Examiner* — Jeanette E Chapman
(74) *Attorney, Agent, or Firm* — Young & Thompson

(57) ABSTRACT

In a device for removing planar objects (2), such as glass panes, from a frame (1) on which the objects (2) are stacked in abutment, wherein spacers (3) are arranged between objects (2), and wherein holding devices (5) are arranged on a support (4) in order to remove the objects (2), at least one removal device (7) for spacers (3) is arranged on the support (4) in the region above the holding devices and preferably has at least one penetration body (8) for spacers (3).

9 Claims, 4 Drawing Sheets

(56) References Cited

U.S. PATENT DOCUMENTS

| | | | | |
|---|---|---|---|---|
| 5,256,030 A | * | 10/1993 | Tanaka | B65G 49/069 |
| | | | | 221/211 |
| 5,282,717 A | * | 2/1994 | Lohr | H05K 13/0061 |
| | | | | 198/803.13 |
| 5,632,595 A | * | 5/1997 | Mori | B65G 49/068 |
| | | | | 414/795.6 |
| 6,182,940 B1 | * | 2/2001 | Miyamoto | B65G 49/069 |
| | | | | 248/682 |
| 7,549,833 B2 | * | 6/2009 | Tang | B65G 49/067 |
| | | | | 414/737 |

FOREIGN PATENT DOCUMENTS

| | | |
|---|---|---|
| EP | 2 261 145 | 12/2010 |
| EP | 2 261 146 | 12/2010 |
| EP | 2368820 | 9/2011 |
| JP | S58207231 | 12/1983 |
| SU | 1435150 A3 | 10/1988 |

OTHER PUBLICATIONS

Austrian Office Action dated Jan. 3, 2014, corresponding to the Foreign Priority Application No. A 186/2013.
Russian Office Action dated Mar. 28, 2016, corresponding to the Foreign Priority Application No. 2015111492.

* cited by examiner

DEVICE AND METHOD FOR REMOVING PLANAR OBJECTS

The invention relates to a device for removing planar objects, such as glass panes, from a frame on which the objects are stacked in abutment, wherein spacers are arranged between objects, and wherein holding devices are arranged on a support in order to remove the objects.

The invention further relates to a method for removing planar objects, such as glass planes, from a frame on which the objects are stacked in abutment, wherein spacers are arranged between objects, and in which the objects are removed from the frame with holding devices that are arranged on a support.

The method according to the invention and the device according to the invention can be employed in storing, sorting, and transporting planar objects, especially glass panes.

When planar objects, especially glass panes, are kept ready in storage (glass warehouse), it is common to deposit them in stacks on frames or bearing blocks.

On the frames, the planar objects (glass panes) stand inclined a few degrees (for example, 5 degrees?) with respect to the perpendicular, so that they lean securely on the frame.

For removing ("unstacking") the foremost planar object from a stack made of such objects, beams equipped with suction heads ("suction beams") are provided. The suction heads are applied to the upper edge of a planar object (glass pane) in order to lift the foremost object from the stack and transport it for further handling or processing, or to restack it in another location. For example, glass panes that have been removed ("unstacked") from a frame are transported to a glass-cutting table. It is conceivable, using the same suction beam, to simultaneously remove the foremost planar objects from multiple stacks that are next to each other on the same frame and are of the same height.

For gripping, removing, and/or depositing individual planar objects, comb-like devices ("combs") are also known. On the teeth of these combs, multiple (for example, three) suction heads are arranged, so that the glass panes can be gripped over an extensive area. The comb shape is chosen so that various devices, outfitted with vacuum suction cups and used for conveying, storing, and transporting, can feed glass panes to each other without it being necessary to suction-grip the panels from both sides (which would be damaging to coatings, for example).

For the purpose of effective warehouse operation, it may make sense to remove packages of multiple planar objects simultaneously from stacks or to deposit them on stacks, rather than to remove planar objects, deposited in the form of stacks, from the stacks individually or to deposit planar objects on stacks individually.

Loading systems, whose holding devices engage behind the package, are usually used thereby.

Removing the foremost package from a stack with a loading system that is equipped with holding devices that engage from behind is only possible when the foremost package and the package behind it are kept at a distance from one another. This also applies when depositing packages onto a stack, whereby the packages are held by holding devices that engage from behind.

It is therefore common to insert spacers between the individual packages of planar objects, especially glass panes, when depositing them onto stacks. These spacers make sure that, when the foremost package of planar objects is removed from the stack, the necessary distance between it and the package behind it is maintained. The necessary distance, as a general rule, amounts to between a few millimeters and a few centimeters.

Spacers of this type can, for example, be made of foam, corrugated board, empty cardboard elements, honeycomb cardboard, corrugated cardboard, or similar materials.

To remove individual planar objects from a stack made of packages separated from each other by spacers, the suction beams or combs, equipped with suction heads and as described above, can be used.

Thereby arises the problem that the spacers (that have been inserted between the packages of planar objects) must be removed before the next planar object of a package can be removed.

Devices for removing spacers of this type are known from EP 2 070 848 A1 and EP 2 261 145 A1.

EP 2 368 820 A shows and describes a device and a method for removing planar objects, whereby a strip with spikes for removing spacers is assigned to a gripper with suction heads. The strip with the spikes can be adjusted between a withdrawn ready position and a working position, whereby in the working position the spikes are pushed into the spacers by a drive.

To operate the strip with the spikes, an assembly with pneumatic cylinders is provided. The suction heads and the strip with the spikes point in opposite directions. As a result, the assembly of suction heads and the strip is arranged such that it can be twisted about a perpendicular axis, so that the suction heads or the strip with the spikes can be used according to preference.

EP 2 261 146 A shows, apart from the fact that grippers are provided for removing spacers, a device that matches the one from EP 2 368 820 A.

One disadvantage of the known devices is that the removal of individual planar objects from the stack and removal of the spacers cannot take place simultaneously; rather, each process must be executed consecutively.

The object of the invention is therefore to create a device and a method of the type mentioned at the outset, with which the removal of individual planar objects from the stack and the removal of spacers can take place simultaneously.

This task is accomplished according to the invention with a device that has the characteristics of claim 1.

This task is further accomplished according to the invention with a method according to claim 12.

Preferred and advantageous embodiments of the invention are the subject matter of the dependent claims.

With the invention, it is possible to simultaneously remove individual planar objects from a stack along with the spacers.

The invention further ensures that the spacers do not shift or slide off of the foremost planar object of a stack such that they can no longer be seized by the means of removing the spacers, as the spacers are stuck between two planar objects until they are seized by the removal device, held by the same, and, together with the planar object, especially the glass pane, are removed from the frame.

This is possible because, with the device according to the invention, it is provided that at least one removal device for spacers is arranged on the support in the region above the holding devices, and that the holding devices and the removal device are arranged on the same side of the support; that is, the means for removing the spacers are affixed to the front of the suction beam or comb, whereby the front of the suction beam or comb is understood as the side to which the suction heads are open, meaning the side that, when holding a planar object, points in the direction of this planar object.

The removal device according to the invention for removing the spacers can, for example, be mounted above the suction cup row of the suction beam or above the first suction cup row of a comb, namely, for example, as an arrangement of nail-like skewers or spikes, whose points lie in a plane parallel to the plane of the suction cups and can be moved linearly normal to the plane of the suction cups, such that the normal component of the translational movement with regard to the plane of the suction cups is non-zero. The plane of the suction cups is thereby to be understood as the plane corresponding to the suction-side surface of a planar object seized by the suction beam or comb. Grasping a spacer takes place through linear movement of a holding device (configured, for example, as a nail strip), in which the spacer is pierced and held fast by the spikes or nails of the strip. The strip is further equipped with a support assembly, for example in the form of a perforated panel, which can be the base of the (U-shaped, for example) profile rail, and which can be moved relative to the profile rail along the spikes or nails. Pierced spacers are removed from the spikes or nails by moving the profile rail forward or moving the spikes or nails backward.

In one possible embodiment of the invention, it can be provided that two or more strips can be arranged next to each other; that the penetrators have barbs on their free end; that at least one drive for moving the strip with the penetrators is arranged on the frame; that the support assembly is movable with respect to the frame; that multiple holding devices are arranged in a row on the support; and that the holding devices are suction cups.

BRIEF DESCRIPTION OF THE DRAWINGS

Further characteristics and advantages of the invention will become clear from the following description of preferred embodiment examples of the invention with the aid of the attached drawings.

DETAILED DESCRIPTION OF THE DRAWINGS

Figure 1:
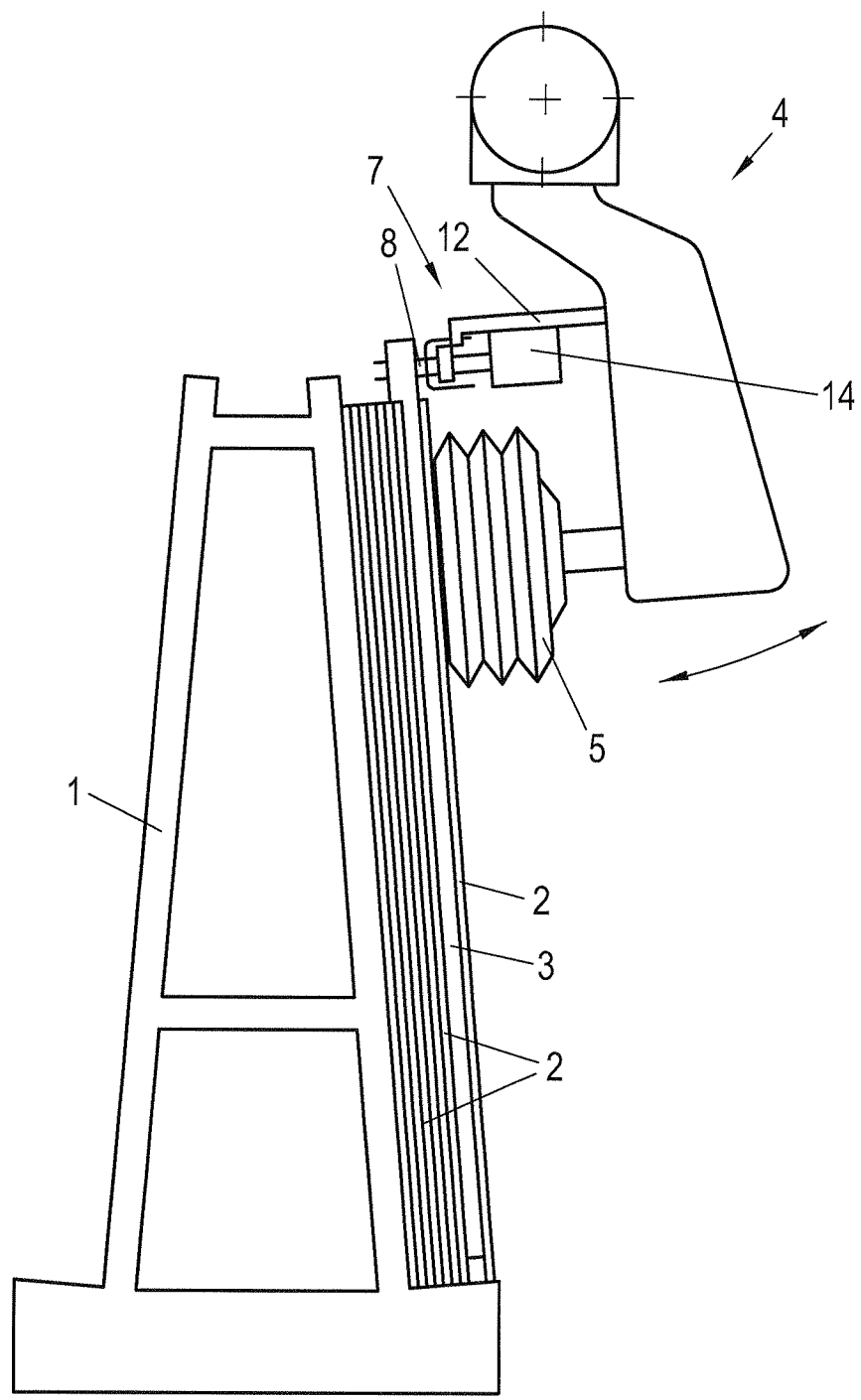
FIG. 1 shows: a heavily schematized side view of one device according to the invention.

FIG. 1 exemplarily shows a first embodiment of a device according to the invention with a frame 1, on which planar objects 2, for example glass panes, are stacked in a position slightly inclined to the perpendicular. The angle at which the objects 2 are leaned is usually about 50 degrees, but can also be larger or smaller. The invention would also be applicable for recumbent planar objects 2.

Figure 4:
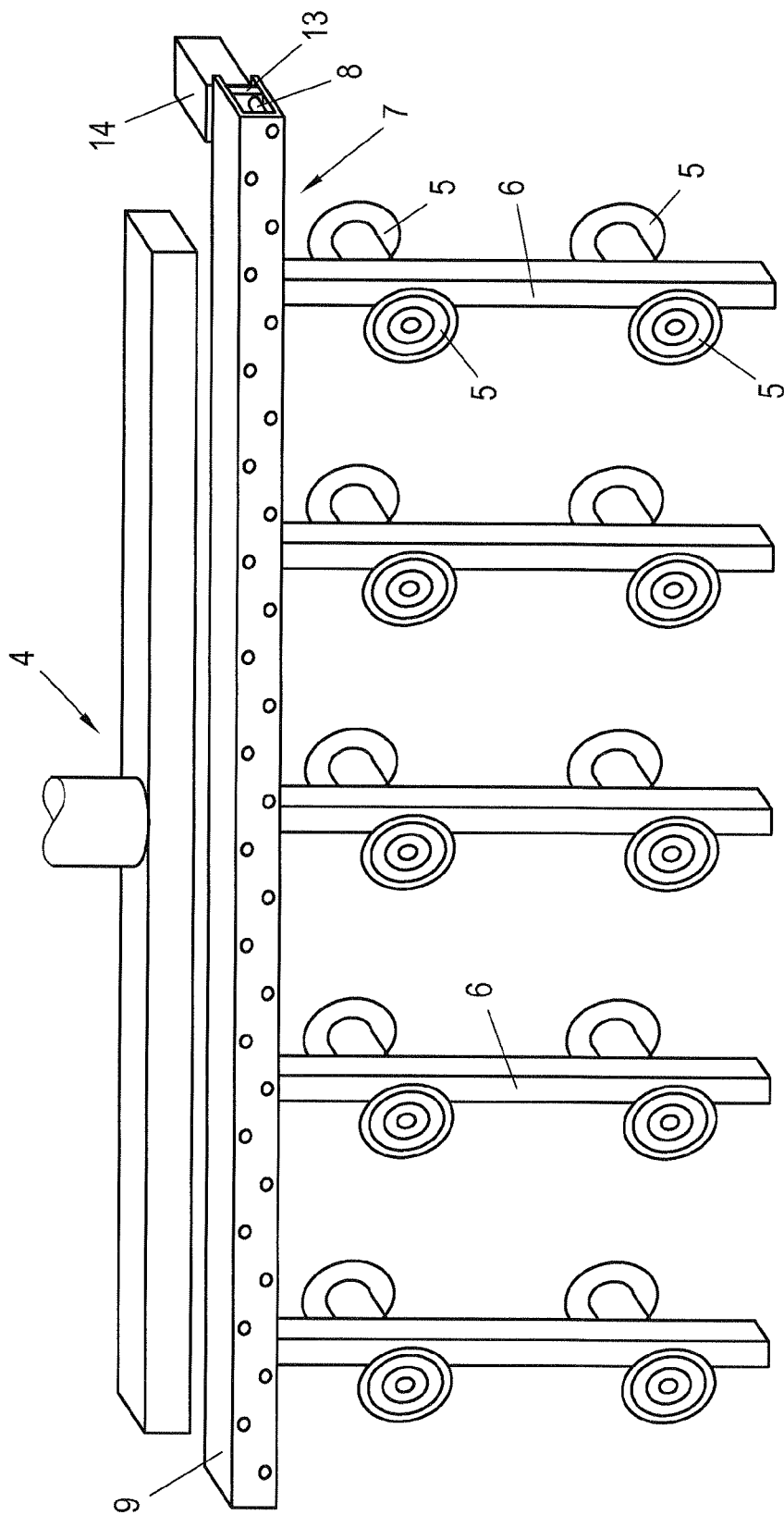
FIG. 4 shows: an alternative embodiment of the invention.

In order to remove the objects 2 from the frame 1, supports 4 that are known in the art with holding devices 5, for example suction cups, can be used. The suction cups 5 can be arranged in rows on the support 4, as is shown exemplarily in FIG. 2, or on comb-like teeth 6 that are arranged on the support, as is shown in FIG. 4. Neither the concrete embodiment of the holding device in the form of suction cups 5 nor the position or arrangement of the suction cups 5 on the support 4 is essential for the invention, and these could, within the scope of the invention, also be configured differently. The embodiments shown in the drawings are, however, preferred.

Individual objects 2 or groups or packages of objects 2 can be separated from each other by means of spacers 3. These must be likewise removed during the removal of the final object 2 that is resting on them, so that the object 2 underneath can be removed without hindrance.

So that the removal of the spacers 3 can be automated and executed without additional steps, at least one removal device 7 for the spacers 3 is arranged on the support 4 and has at least one penetration body 8 for the spacers 3.

In the preferred embodiments of the invention depicted in the drawings, the removal device 7 has a U-shaped profile rail 9, in whose base 11 a number of holes 10 are drilled, through which a corresponding number of penetration bodies 8 can move. Preferably, two rows of holes 10 are provided, whereby the holes 10 of the two rows are offset from each other. The profile rail 9 can either run along the entire width of the support 4, meaning that it essentially extends over the same width as the suction cups 5, or two or more than two profile rails 9 are provided that each only extend over a part of this width.

The first version has the advantage that all spacers 3 are securely seized regardless of where they are. The second version has the advantage of a respectively smaller frame size, whereby the profile rails 9 only have to be where the spacers 3 are usually arranged.

In the depicted embodiment of the invention, the profile rail 9 is affixed firmly on the support 4 via a bracket 12, and the penetration bodies 8 are movable with respect to the profile rail 9. In addition, the penetration bodies 8 are fixed to a strip 13 that is moved back and forth by drives 14, preferably respectively a drive 14 on the end of the respective profile rail 9 or removal device 7.

Figure 2:
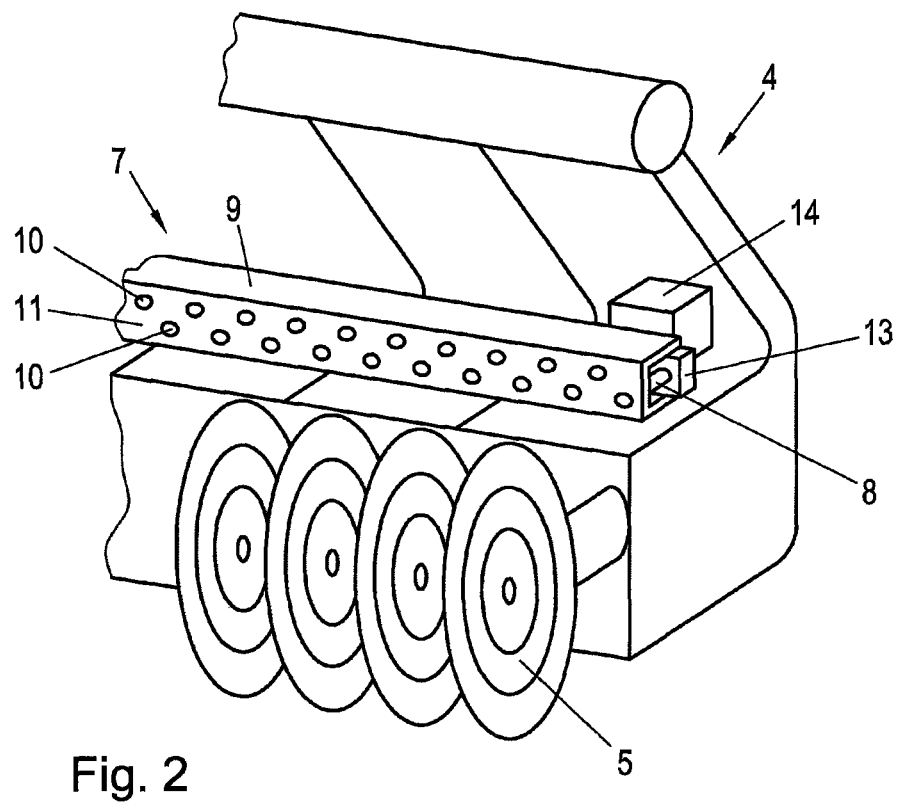
FIG. 2 shows: one detail of the device from FIG. 1 at an angle.
Figure 3:
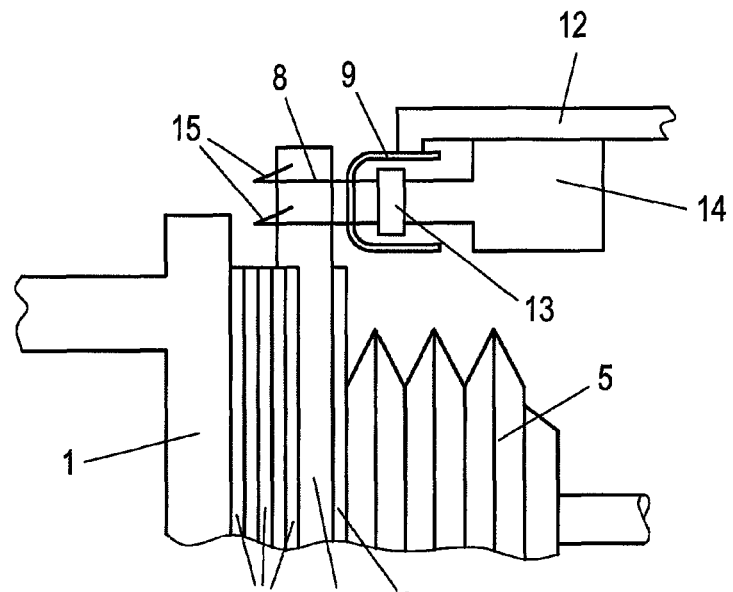
FIG. 3 shows: a further detail from FIG. 1, enlarged

When a planar object 2, for example a glass pane, under or behind which there is a spacer 3, as is depicted in FIGS. 1 and 2, is removed, the suction cups 5 are applied, as depicted, to the foremost glass pane 2 and are then fixed by known methods through underpressure on the glass pane 2. The penetration bodies 8 are thereby in the withdrawn position depicted in FIG. 2. At the same time as the underpressure is applied, or thereafter, the drives 14 are operated so that the penetration bodies 8 penetrate into the spacers 3. This is depicted in FIGS. 1 and 3. In this embodiment of the invention according to the invention, the spacers 3 are seized while they are still held fast by the foremost glass pane 2, whereby they are kept in position and can therefore neither shift nor fall off when during gripping by the penetration bodies 8 and removal.

The penetration bodies 8 are preferably spikes, nails, or the like, and are preferably so long that they completely penetrate the spacers 3. So that the penetration bodies 8 are not unintentionally pulled out of the spacers 3 and the spacers 3 thereby slip away from the gripping device 7, it is further preferred that the penetration bodies 8 have, at least on their free ends or their tips, a barb 15 or something similar. One or more notches or the like can be additionally or alternatively affixed in the penetration bodies 8 along their length in order to avoid unintentional slipping.

After the glass pane 2 has, along with the spacers 3, been removed from the frame 1, the strip 13 can, at an appropriate location, for example via a collection bin provided for the purpose, be pulled back by the drives 14, whereby the penetration bodies 8 are pulled out of the spacers 3. As the penetration bodies 8 are preferably, as described, equipped with barbs 15 or the like, the base 11 of the profile rail 9 acts as a support assembly for the spacers 3, so that the penetration bodies can be securely removed from the spacers 3.

With the invention, it would alternatively be possible to move not (only) the penetration bodies 8 back and forth, but rather the profile rail 7 (as well), in order to remove the spacers 3 from the penetration bodies 8. A tilting movement of the spacers 3 could thus be avoided during the removal around the top edge of the glass pane 2.

Figure 5:
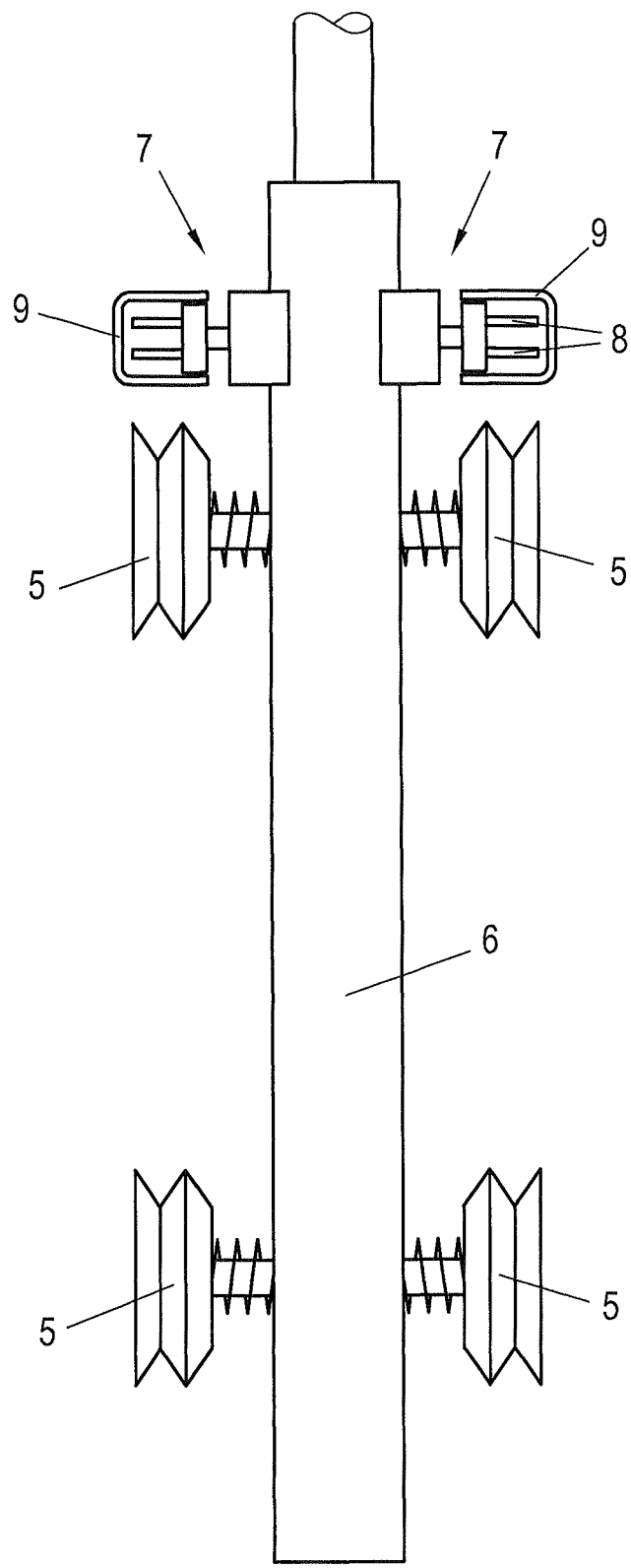
FIG. 5 shows: one embodiment of the invention, expanded with respect to the embodiment of FIG. 4, from the side.

In FIGS. 4 and 5, an embodiment of the invention is shown in which double-sided suction cups 5 are arranged on the teeth 6 of the support 4. Here, it can be provided according to the invention that the removal device 7 according to the invention is only affixed on one side, like FIG. 4 shows, or that the removal device 7 according to the invention is affixed on both sides, like FIG. 5 shows. The latter is naturally also possible with an array of holding devices 5 as according to, for example, FIGS. 1 to 3.

The invention claimed is:

1. A device for removing planar objects (2) from a frame (1) on which the objects (2) are stacked in abutment, the device comprising:
    spacers (3) arranged between the objects (2);
    holding devices (5) arranged on a support (4) in order to remove the objects (2);
    at least one removal device (7) for the spacers (3) arranged on the support (4) in a region above the holding devices (5);
    the at least one removal device (7) having at least one penetrating body (8) for the spacers (3), wherein the holding devices (5) and the at least one removal device (7) are arranged on a same side of the support (4); and
    at least one strip (13) having thereon two or more of the penetrating bodies (8) arranged next to each other.

2. The device according to claim 1, wherein said penetrating body comprises at least one of spikes and nails.

3. The device according to claim 1, wherein the at least one removal device (7) has a support assembly (11) for the spacers (3).

4. The device according to claim 3, wherein the support assembly (11) and the penetrating body (8) are movable relative to each other.

5. The device according to claim 3, wherein the penetrating body (8) and the support assembly (11) are arranged on a frame, and wherein the penetrating body (8) is moveable with respect to the frame (12) and the support assembly (11).

6. The device according to claim 3, wherein the support assembly (11) is a base of an essentially U-shaped profile rail (9) that faces the spacers (3).

7. The device according to claim 3, wherein the support assembly (11) has holes (10) that are arranged in at least two rows and through which said penetrating body is movable.

8. The device according to claim 1, wherein the holding devices (5) are arranged in a row on the support (4).

9. The device according to claim 1, wherein the support (4) has teeth (6) arranged like combs, on each of which at least one of the holding devices (5) is arranged.

* * * * *